(12) United States Patent
Gianangeli

(10) Patent No.: US 12,542,070 B2
(45) Date of Patent: Feb. 3, 2026

(54) TEACHING AID

(71) Applicant: John Michael Gianangeli, Saint Clairsville, OH (US)

(72) Inventor: John Michael Gianangeli, Saint Clairsville, OH (US)

( * ) Notice: Subject to any disclaimer, the term of this patent is extended or adjusted under 35 U.S.C. 154(b) by 738 days.

(21) Appl. No.: 17/936,525

(22) Filed: Sep. 29, 2022

(65) Prior Publication Data

US 2023/0410678 A1    Dec. 21, 2023

Related U.S. Application Data

(60) Provisional application No. 63/366,546, filed on Jun. 17, 2022.

(51) Int. Cl.
| | | |
|---|---|---|
| *G09B 17/00* | (2006.01) | |
| *G04C 17/00* | (2006.01) | |

(52) U.S. Cl.
CPC ........... *G09B 17/003* (2013.01); *G04C 17/00* (2013.01)

(58) Field of Classification Search
CPC ...................................................... G09B 19/12
See application file for complete search history.

(56) References Cited

U.S. PATENT DOCUMENTS

| | | | |
|---|---|---|---|
| 1,085,405 A | 1/1914 | Dadd | |
| 2,907,123 A | 10/1959 | Mcmahon | |
| 3,994,078 A | 11/1976 | Liu | |
| 4,358,278 A | 11/1982 | Goldfarb | |
| 4,634,385 A | 1/1987 | Stemper | |
| 6,017,260 A | 1/2000 | Dolan | |
| 6,416,216 B1 | 7/2002 | Haughey | |
| 6,648,647 B2 | 11/2003 | Wood et al. | |
| 6,869,286 B2 | 3/2005 | Furry | |
| 7,515,509 B2 | 4/2009 | Klein | |
| 8,355,296 B2 | 1/2013 | Endrasik | |
| 2002/0126580 A1* | 9/2002 | McGuire | G09B 19/12 368/1 |
| 2003/0170595 A1 | 9/2003 | Thompson | |
| 2004/0219496 A1 | 11/2004 | Stevinson | |
| 2007/0160968 A1 | 7/2007 | Shachrur et al. | |
| 2009/0016168 A1 | 1/2009 | Smith | |
| 2010/0273137 A1 | 10/2010 | Carter et al. | |
| 2017/0102838 A1* | 4/2017 | Roy | G06F 3/0482 |

* cited by examiner

*Primary Examiner* — Robert J Utama

(74) *Attorney, Agent, or Firm* — Dunlap Bennett & Ludwig PLLC

(57) ABSTRACT

A teaching aid for those learning to tell time and learn the alphabet of a language. The teaching aid includes an interactive touchscreen alphabetic display. The present invention may assist in teaching the alphabet through providing a tactile-interactive medium, the touchscreen alphabetic display, for a user to select specific alphabetic characters and be provided visual feedback in the form of an image associate or corresponding with each selected alphabetic character. The teaching aid also provides a clock display for teaching time to the user.

5 Claims, 3 Drawing Sheets

TEACHING AID

CROSS-REFERENCE TO RELATED APPLICATION

This application claims the benefit of priority of U.S. provisional application No. 63/366,546, filed Jun. 17, 2022, the contents of which are herein incorporated by reference.

BACKGROUND OF THE INVENTION

The present invention relates to teaching aids and, more particularly, to a toy with an alphabet wheel and a clock.

Children around the ages 3-6 have the cognitive ability to learn the alphabet and how to tell time; however, it is often difficult to engage a child in the learning process, as most children would rather play games and have fun.

Presently, not enough toys attempt to teach children while entertaining them and encouraging the learning experience.

As can be seen, there is a need for a toy that can help children learn the alphabet and learn to tell time while entertaining them and encouraging the learning experience.

SUMMARY OF THE INVENTION

In one aspect of the present invention, a teaching aid including the following: a housing having a face; a touchscreen alphabetic display provided along the face, wherein the touchscreen alphabetic display provides a circumferential control region and a visual unit circumscribed by the control region; and the control region represents a plurality of alphabetic characters, wherein the control region is configured to, for each alphabetic character, when tactilely engaged generate a corresponding image in the visual unit, wherein the corresponding image is associated with the engaged alphabetic character.

In another aspect of the present invention, the teaching aid includes a clock display provided along the face spaced apart from the touchscreen alphabetic display, wherein the clock display provides an analog clock and a digital time display, wherein the housing provides a stand movable between a closed position and an open position assisting an upright position of the housing, wherein the housing provides a speaker, a battery compartment, and a clock hand control that manually moves hands of the analog clock.

In yet another aspect of the present invention, a method for teaching an alphabet includes the following: providing a colorful toy having a face; presenting a touchscreen wheel along the face; representing a plurality of alphabetic characters along a circumference of the touchscreen wheel, wherein a visual unit occupies a hub of the touchscreen wheel; and generating an image in the visual unit when each alphabetic character is tactilely engaged, wherein the image represents a word that starts with said alphabetic character.

These and other features, aspects and advantages of the present invention will become better understood with reference to the following drawings, description and claims.

DETAILED DESCRIPTION OF THE INVENTION

Figure 1:
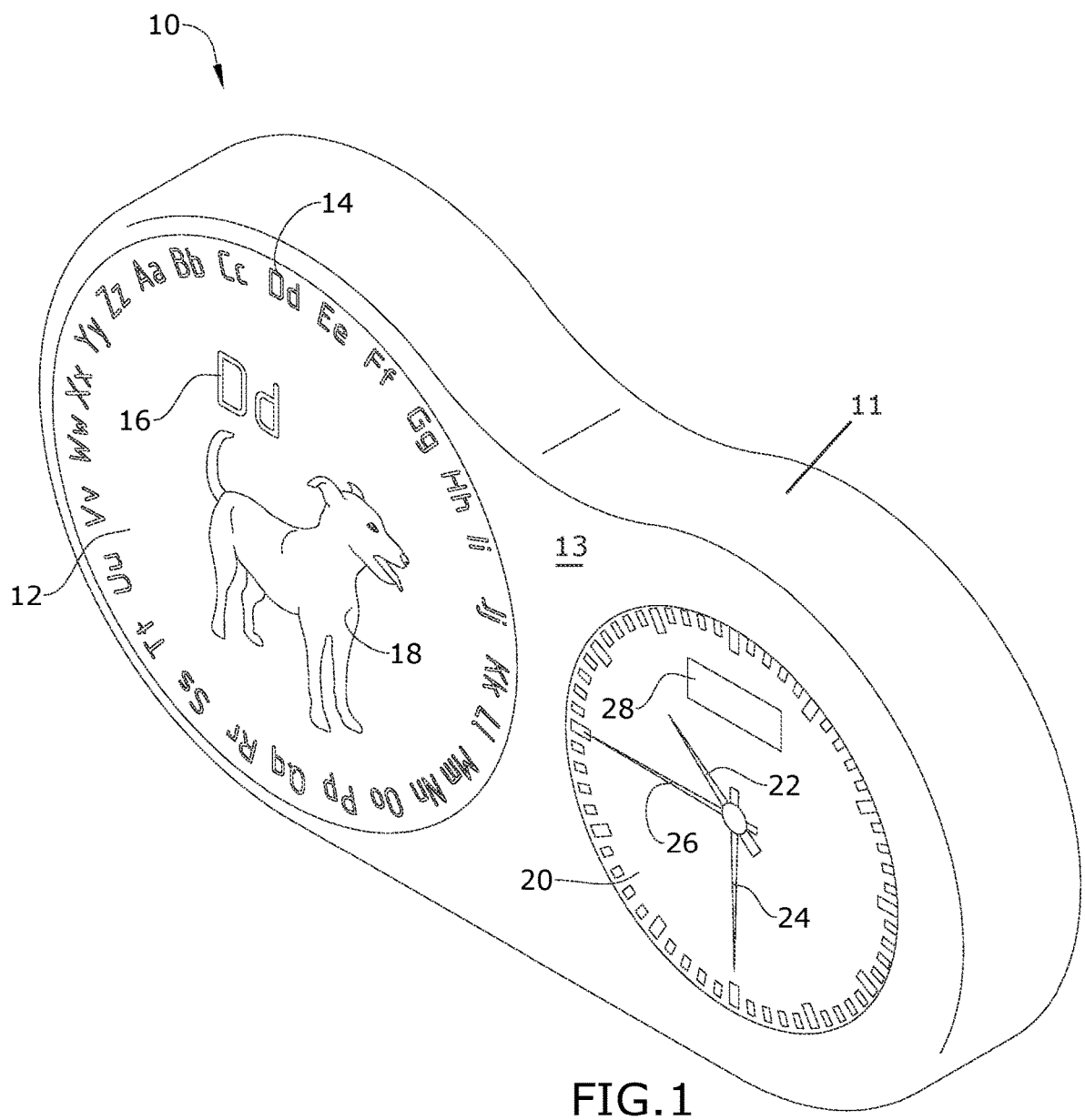
FIG. 1 is a perspective view of an exemplary embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a teaching aid for those learning to tell time and learn the alphabet of a language. The teaching aid includes an interactive touchscreen alphabetic display. The present invention may assist in teaching the alphabet through providing a tactile-interactive medium, the touchscreen alphabetic display, for a user to select specific alphabetic characters and be provided visual feedback in the form of an image associate or corresponding with each selected alphabetic character. The teaching aid also provides a clock display for teaching time to the user.

Referring now to FIGS. 1 through 5, the present invention may include a teaching aid 10 for learning the alphabet and for telling time. The teaching aid has a housing 11 with a face 13 or front side. The housing 11 provides along the face 13 at least two external displays: an alphabet display 12 and a clock display 20.

Along a periphery of the alphabet display 12 may be alphabetic characters 14, representing each character of the alphabet of a language. It should be understood that the language is not limited to English and the characters are not limited to letters, as shown in the appended figures. Rather, the alphabetic character 14 may be symbols of a non-English language.

The alphabet display 12 may be the shape of a wheel. Each alphabetic character 14 may include an uppercase and lowercase version of said alphabetic character 14. The alphabet display 12 may have a central portion that provides a selected alphabetic character 16 and a representation of a corresponding image 18 that starts with the selected alphabetic character 16; for example, if the selected alphabetic character 16 is a 'D' and the represented image 18 is a 'dog'. The representation of the corresponding image 18 may be displayed digitally in the central portion of the wheel. In some embodiments of the present invention, the selected alphabetic character 16 may be selected by touch, and thus the alphabet display 12 has touchscreen functionality. Upon selection of the selected alphabetic character 16, the corresponding image 18 may be displayed digitally on a face of the alphabet display 12.

A user need not actually touch the touchscreen alphabet display 12 with their finger, as other suitable input alternatives may be used in other implementations, such as a stylus; though, the tactile sensation of the learner, it has been held, facilitates the learning process through triggering additional brain activity.

Figure 2:
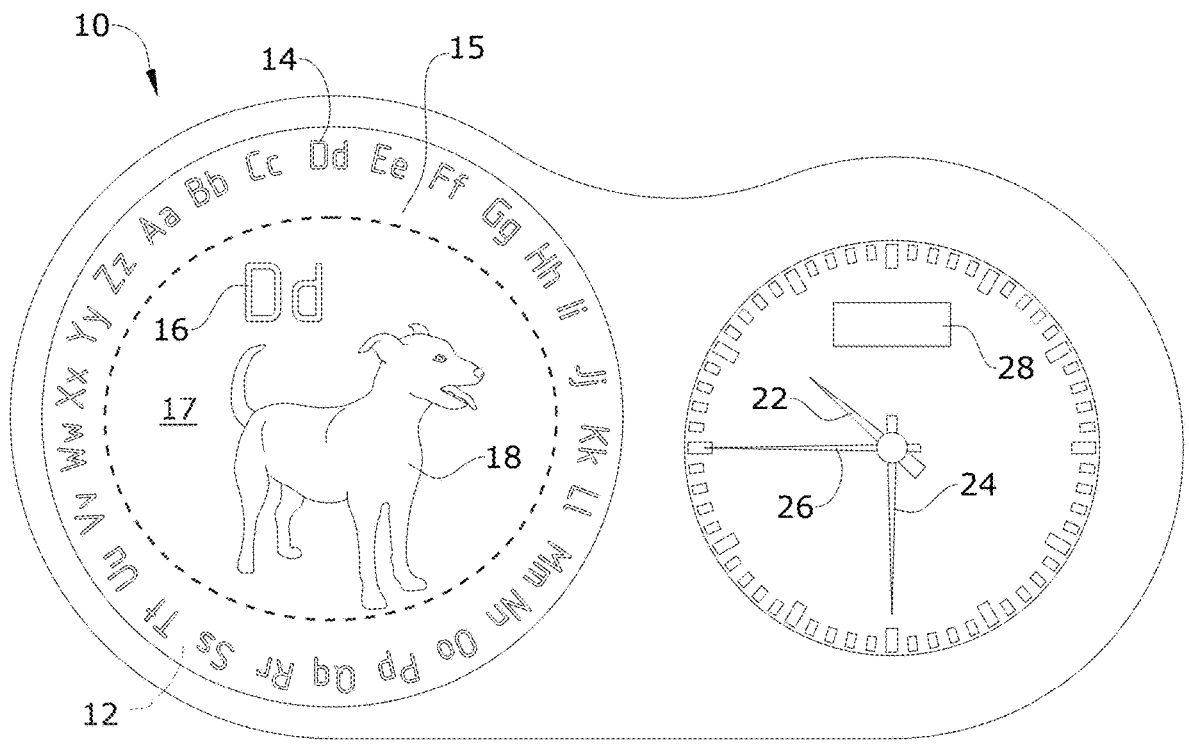
FIG. 2 is a front elevation view of an exemplary embodiment of the present invention.
Figure 3:
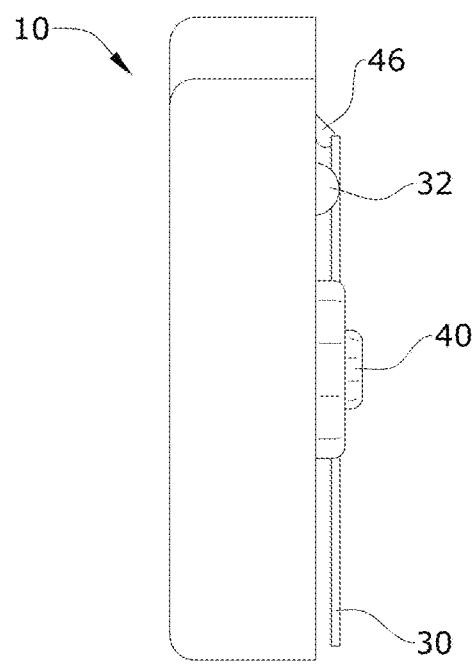
FIG. 3 is a right-side elevation view of an exemplary embodiment of the present invention.
Figure 4:
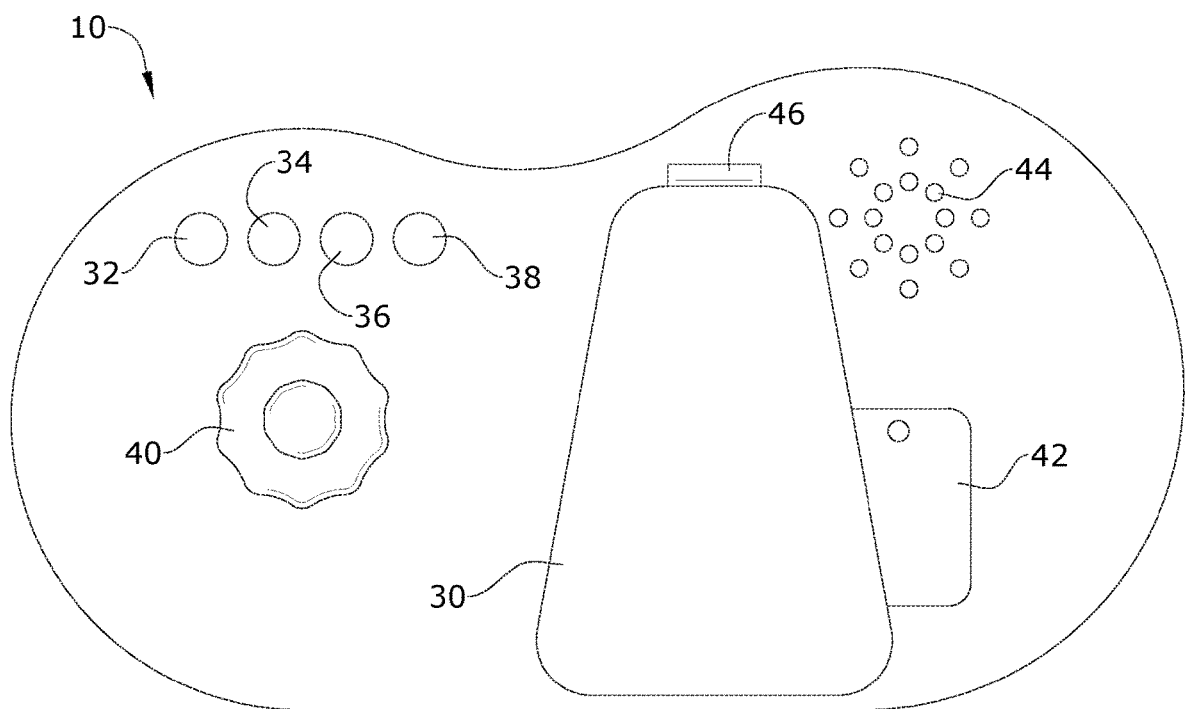
FIG. 4 is a rear elevation view of an exemplary embodiment of the present invention.

Within the touchscreen alphabet display 12 is a control region where at least the alphabetic characters 14 are displayed. Since in the embodiment represented in FIG. 1, the control region 15 is coextensive with the touchscreen alphabet display 12, and so it is not depicted separately from the touchscreen alphabet display 12 in FIG. 1. In other embodiments, the control region 15 may be smaller than or equal in size to the touchscreen alphabet display 12, as shown in FIG. 2, which delineates the control region and a visual display unit 17 with a dashed line.

The alphabet display 12 may include a visual display unit 17 along its central portion using any suitable visual-output display device that is typically used to display a digital representation designed primarily for user interaction. Other examples of suitable visual display units 17 include (by way of example and not limitation): any flat-panel display, such as plasma, liquid crystal display (LCD) or organic light emitting diode (OLED); cathode ray tube (CRT) display or the like.

The clock display 20 may be displayed on the face 13 of the teaching aid 10, next to the alphabet display 12. The clock display 20 may be an analog clock with an hour hand 22, a minute hand 24, and a second hand 26. The hands 22, 24, and 26 of the analog clock may be manipulated and turned to tactilely help a user learn how to tell time. The clock display 20 may provide a digital time display 28 to reinforce the teaching of what the analog time clock is representing.

Figure 5:
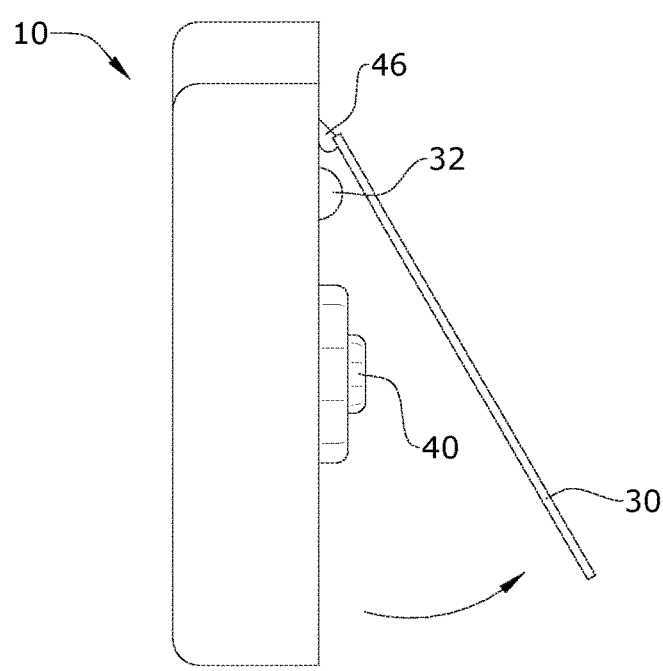
FIG. 5 is a side elevation view of an exemplary embodiment of the present invention, illustrating a stand in an open position.

The teaching aid 10 may further comprise controls along a rear surface of the housing 11, such as a first button 32, a second button 34, a third button 36, and a fourth button 38, which when activated can control the digital clock display 28, a speaker 44, and the like. The rear of the housing 11 may also provide a manual clock hand control 40 for selectively moving the hour hand 22, the minute hand 24, and the second hand 26. A stand 30 may be pivotably connected to the rear surface by way of at pivot point 46, such as a hinge, so that the stand can be moved between a closed position and an open position (as illustrated in FIG. 5) for assisting the housing 11 in standing upright so that its face 13 is visible to a user.

The housing 11 may contain an internal power source, such as batteries, in a compartment 42.

The present invention may be used by a child, at home or in school, to help teach the alphabet and how to tell time. The present invention may be for children ages 3-6 or others who are learning to tell time and master the alphabet.

The present invention may be made of plastic. An outer shell of the teaching aid 10 may be available in a variety of colors. It may be manufactured by a toy company. Components may be manufactured and then assembled elsewhere to complete the finished product.

The present invention may be fun, engaging, visually pleasing, educational, battery-operated, a great gift, and/or a great classroom accessory. It may help young children master time-telling and the alphabet while displaying relatable pictures for each corresponding letter of the alphabet.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A teaching aid for teaching both an entire alphabet and telling time to a child, the teaching aid comprising:
   a housing having a child-facing surface;
   a touchscreen alphabetic display provided along the child-facing surface, wherein the touchscreen alphabetic display provides a circumferential control region and a visual unit circumscribed by the control region;
   wherein the circumferential control region represents alphabetic characters of said entire alphabet, wherein the circumferential control region is configured to, for when each alphabetic character is tactilely engaged, generate a corresponding image in the visual unit, wherein the corresponding image represents a word that starts with the tactilely engaged alphabetic character; and
   a clock display representing an entire clock face along the child-facing surface so that the entire clock display is along a first side of the child-facing surface and the entire touchscreen alphabetic display is a second side of the child-facing surface so that there is a surface area of the child-facing surface between said entireties, whereby an educator is enabled to sequentially teach the child the entire alphabet or telling time without reorienting the child-facing surface but having the child switch their visual focus to either the first side or the second side respectively.

2. The teaching aid of claim 1,
   wherein the clock display simultaneously represents an analog clock and a digital time display.

3. The teaching aid of claim 2,
   wherein the housing provides a stand movable between a closed position and an open position assisting an upright position of the housing.

4. The teaching aid of claim 2,
   wherein the housing provides controls configured for controlling the clock display along an educator-facing surface, facing in an opposite direction as the child-facing surface, so that the educator is enabled to selectively control the clock display without re-orienting the child-facing surface.

5. A method for teaching a child an alphabet and telling time through one device that does not need to be reoriented between teaching the alphabet and teaching telling time, the method comprising:

providing a teaching aid of claim 4;

presenting the child-facing surface to the child; and after generating an image in the visual unit when each alphabetic character is tactilely engaged, wherein the image represents a word that starts with said alphabetic character, selectively controlling the clock display along the educator-facing surface, without reorienting the child-facing surface.

* * * * *